(No Model.)
F. J. BLANKE.
SWIVEL PLOW.
No. 396,460. Patented Jan. 22, 1889.
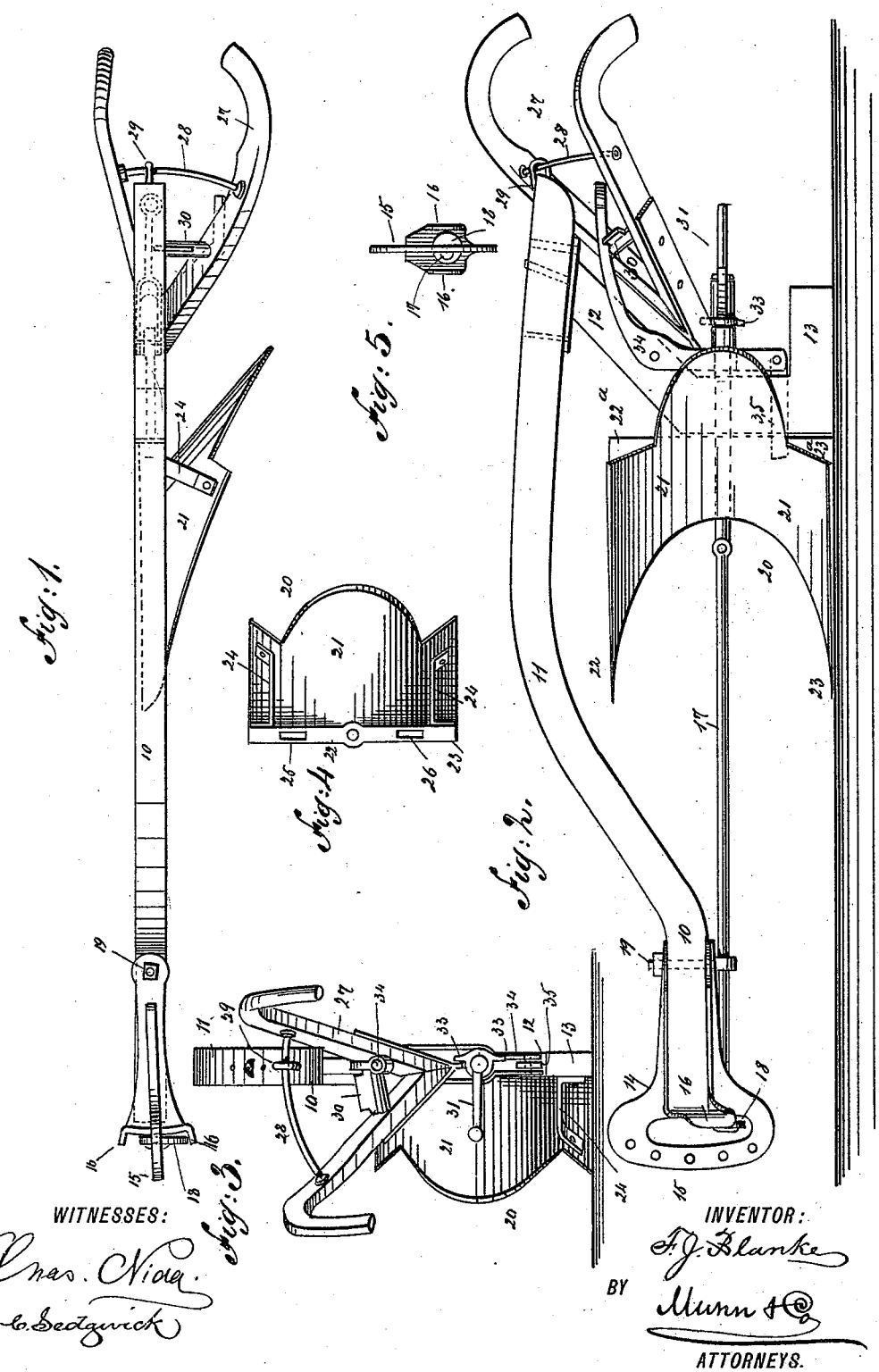
WITNESSES:
Chas. Nida
E. Sedgwick
INVENTOR:
F. J. Blanke
BY Munn & Co.
ATTORNEYS.
N. PETERS, Photo-Lithographer, Washington, D. C.

UNITED STATES PATENT OFFICE.

FERDINAND J. BLANKE, OF WHITEWATER, WISCONSIN.

SWIVEL-PLOW.

SPECIFICATION forming part of Letters Patent No. 396,460, dated January 22, 1889.

Application filed August 25, 1888. Serial No. 283,717. (No model.)

*To all whom it may concern:*

Be it known that I, FERDINAND JOSEPH BLANKE, of Whitewater, in the county of Walworth and State of Wisconsin, have invented a new and Improved Swivel-Plow, of which the following is a full, clear, and exact description.

My invention relates to an improvement in swivel-plows, and has for its object to provide a means whereby the plows may be reversed in an expeditious and convenient manner and the draft and position of the handles be simultaneously changed to correspond with the plow brought into use, and a further object of the invention is to provide a swivel-plow of simple, durable, light, and effective construction.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement. Fig. 2 is a side elevation. Fig. 3 is a rear end view. Fig. 4 is a rear end view of the double plow, and Fig. 5 is a front view of the clevis.

In carrying out the invention the plow-beam 10 is provided with an arch, 11, extending from a point near the front upward and horizontally to the rear, as best shown in Fig. 2.

A standard, 12, is secured to the under side of the plow-beam near the rear, which standard is preferably projected forward and vertically downward, having attached thereto at the lower end, or cast integral therewith, a rearwardly-extending horizontal runner or shoe, 13.

A clevis, 14, is pivoted upon the forward end of the plow-beam, provided to the rear of the apertured draft member 15 with forwardly-extending horizontally-aligning side ears, 16, as best shown in Fig. 5.

A longitudinal shaft, 17, is journaled at one end in the standard 12, the other end being projected through and journaled in an eye produced in the under side of the clevis, to the rear of the draft member 15, and between said draft member and the head of the clevis a cam, 18, is secured to the forward end of the shaft 17, whereby when the shaft is revolved the cam will engage one of the ears 16 and throw the clevis to one side or the other, as occasion may demand.

The rear end of the clevis is pivoted and an additional bearing is provided for the shaft 17 by passing a suitable pin, 19, upward through the clevis and plow-beam, which pin is threaded at the upper end to receive a suitable nut, and provided with an eye at the lower end, embracing the shaft.

Immediately in front of the standard 12 a double plow, 20, is centrally and rigidly attached to the shaft 17, the shares pointing forward and the mold-boards inclining rearward.

The plow consists of a continuous double mold-board, 21, having attached thereto in any approved manner, respectively, a right and left share, 22 and 23.

The landsides 22ª 23ª of the shares are in the same vertical plane, as illustrated in Fig. 4, and the rear or diverging ends of the shares and the landsides are united and strengthened by upper and lower braces, 24. In the rear end of both landsides a recess, 25 and 26, is respectively formed, purposed to receive a locking-bolt, as will be hereinafter set forth.

The lower ends of the plow-handles 27 are pivoted upon the shaft 17 immediately to the rear of the standard 12, which handles are united near their upper extremities by a curved rod, 28, sliding in an eye or staple, 29, attached to the plow-beam, and below said guide-rod 28 a latch-bar, 30, is secured between the handles, provided with a central upwardly-extending boss, as best shown in Figs. 2 and 3.

A crank-arm, 31, is rigidly secured to the rear end of the shaft 17, provided with an integral sleeve, and lugs 33 cast upon the forward end of said sleeve—one at each side—whereby when the shaft is revolved by said crank one of the lugs will engage with the plow-handles and throw them in proper position.

An angled lever, 34, is pivoted upon the standard 12, the vertical member whereof is slotted to permit the passage of the shaft 17, and in the lower end of the said vertical member a bolt, 35, is pivoted, which bolt, sliding horizontally in the standard 12, is adapted to enter, respectively, the recesses 25 and 26 of the plow, as is best shown in dotted lines, Fig. 2. The upper or horizontal member of the lever 34 extends rearward to a bearing upon the latch-rod 30.

The beam 10 may be made in any desired shape admitting of the revolution of the plows, and equivalent constructions may be substituted for the constructions illustrated and described without departing from the spirit of the invention.

In operation, to reverse the plow, the rear end of the lever 34 is elevated, disengaging it from the latch-bar and withdrawing the bolt 35. The crank-arm is then turned, revolving the shaft 17 until the upper share is brought down in contact with the ground. As the shaft is revolved, the cam engages with the clevis, reversing the inclination thereof, and one lug, 33, integral with the crank, throws the handle over to proper position, whereupon the upper end of the lever drops down upon the latch-bar at one side of the boss, and is effectually locked between the boss and the contiguous face of the handle, as illustrated in Fig. 2.

Having thus fully described my invention, I claim as new and desire to secure by Letters Patent—

1. The combination, with a plow-beam, a standard projected therefrom, and a longitudinal rotary shaft journaled in said standard and upon the beam, of a double plow secured to said shaft, consisting of continuous mold-boards and attached aligning shares, and provided with recesses in the rear end of the landsides, a lever pivoted to the standard, a bolt sliding in the standard pivoted to the lever, and a crank-arm secured to the rear end of the shaft, substantially as shown and described.

2. The combination, with a plow-beam, a standard projected therefrom, and a longitudinal shaft journaled in said standard and upon said beam, of a double plow secured to said shaft, provided with a recess in the rear of each landside, a lever fulcrumed to the standard, a bolt sliding in said standard pivoted to said lever, plow-handles pivoted upon the shaft, and a crank-arm secured to the rear end of the shaft, having lugs capable of alternately engaging the handles, substantially as shown and described.

3. The combination, with a plow-beam, a standard projected therefrom, and a longitudinal shaft journaled in said standard and upon the beam, of a double plow secured to said shaft, provided with a recess in the rear of each landside, a lever fulcrumed upon the standard, a bolt sliding in said standard pivoted to said lever, plow-handles having a sliding attachment to the beam and pivoted upon the shaft, a latch-bar secured to said handles, and a crank-arm secured to the rear end of the shaft, provided with oppositely-disposed lugs alternately engaging the handles, substantially as shown and described.

4. The combination, with a plow-beam, a standard projected therefrom, and a clevis pivoted to the beam, having side ears, of a longitudinal rotary shaft journaled in said standard and clevis, a cam secured to the forward end of the shaft, capable of alternately engaging the side ears of the clevis, and a double plow rigidly attached to the said shaft, substantially as shown and described.

FERDINAND J. BLANKE.

Witnesses:
W. H. WRIGHT,
H. HEADY.